G. W. BROWN.
CARBURETER.
APPLICATION FILED NOV. 17, 1909.
951,590.
Patented Mar. 8, 1910.
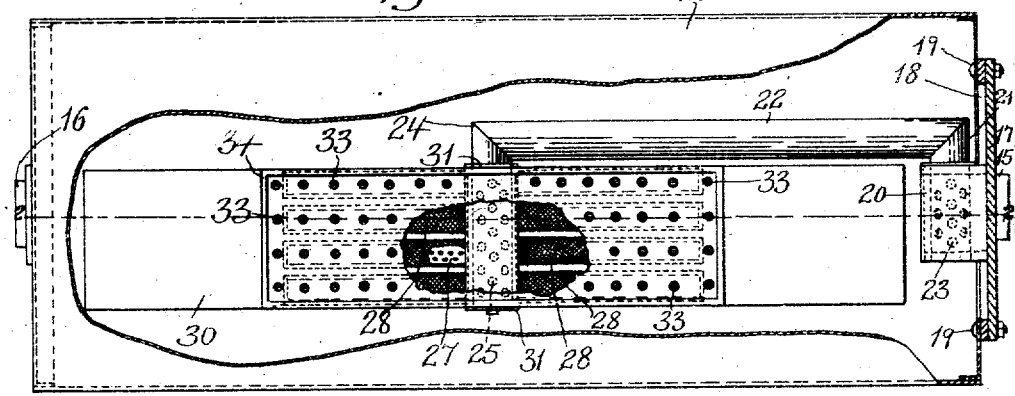
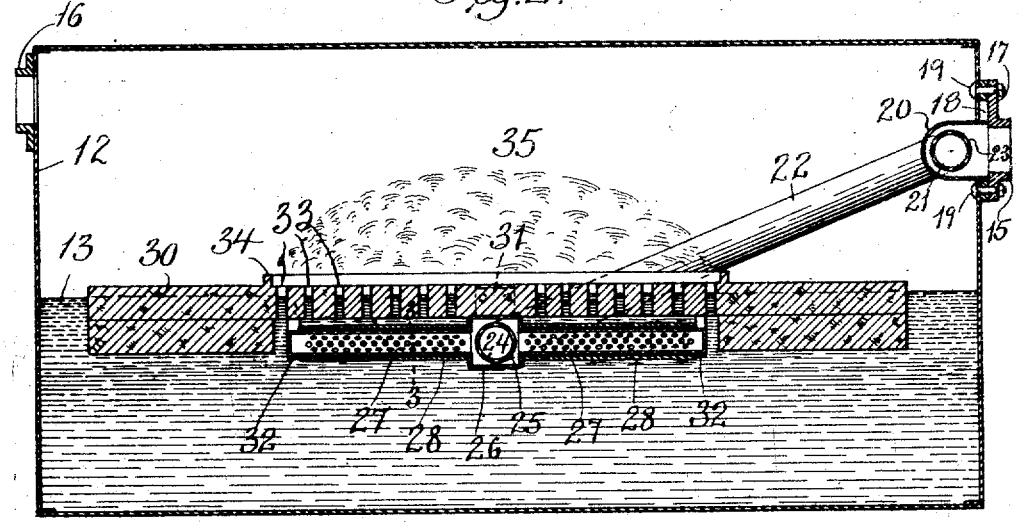
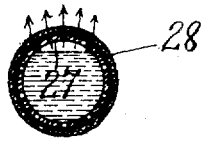
Witnesses:
Inventor:
Gilman W. Brown

UNITED STATES PATENT OFFICE.

GILMAN W. BROWN, OF WEST NEWBURY, MASSACHUSETTS.

CARBURETER.

951,590. Specification of Letters Patent. Patented Mar. 8, 1910.

Application filed November 17, 1909. Serial No. 528,485.

*To all whom it may concern:*

Be it known that I, GILMAN W. BROWN, of West Newbury, in the county of Essex and State of Massachusetts, have invented certain new and useful Improvements in Carbureters, of which the following is a specification.

This invention relates to a carbureter in which air is forced into a body of hydrocarbon liquid through a floating distributer submerged below the surface of the body of liquid, and adapted to rise and fall therewith.

The invention has for its object to provide a floating distributer adapted to produce a mixture of gas (so called) of uniform quality and richness whether the apparatus is working under a light or a heavy load, or in other words, whether the consumption of the gas is relatively light or relatively heavy.

The invention consists in the improvements which I will now proceed to describe and claim.

Of the accompanying drawings, forming a part of this specification,—Figure 1 represents a top plan view of a carbureter embodying my invention, portions of the tank or reservoir being broken away, and other portions shown in section, and a portion of the float, hereinafter described, being also broken away. Fig. 2 represents a section on line 2—2 of Fig. 1. Fig. 3 represents a section of an air-delivering member on line 3—3 of Fig. 2. Fig. 4 represents a view similar to Fig. 3, showing the action under a higher air pressure.

The same reference characters indicate the same parts in all the figures.

In the drawings,—12 represents a tank adapted to contain a body of hydrocarbon liquid 13. The tank is provided with an inlet 15 for air, and an outlet 16 for the mixture of air and hydrocarbon vapor produced by the apparatus, said mixture being hereinafter referred to as gas. The air inlet 15 forms a part of a closure 17 which is adapted to close an opening 18 in one of the walls of the tank, means such as bolts 19 being employed to detachably secure the closure 17 to the margin of said opening. The opening 18 is of sufficient size to permit the passage through it of the air distributer, float, and air-delivering conduit, hereinafter described. To the closure 17 is suitably affixed a casing 20, the end portions of which form bearings for a tubular trunnion 21 which forms a part of an air conduit 22 adapted to swing vertically in the tank by the turning of the trunnion 21 in the casing 20. The trunnion 21 is provided with orifices 23 which permit the free entrance of air from the inlet 15 into the trunnion 21, the latter being therefore an air-receiving trunnion formed on one end of the conduit 22. At the opposite end upon the periphery of the delivering trunnion 24 provided with air-delivering orifices 25. On the trunnion 24 is mounted to rock or oscillate an air distributer comprising a central hollow member or manifold 26 formed as a box or casing, the ends of which have circular openings formed to receive and turn upon the periphery of the delivering trunnion 24. The air distributer also comprises a plurality of horizontal tubular foraminous air-distributing members which are preferably arranged in two series projecting from opposite sides of the central member 26. Each delivering member includes a tube 27 which may be of suitable construction providing a large number of relatively small air outlets of substantially uniform size. For example, the tube 27 may be of perforated sheet metal or of woven wire, the openings in any case being so small that the tube is adapted to discharge a large number of fine jets or streams of air into the hydrocarbon liquid. I prefer to provide each tube 27 with an external wrapping 28 of textile fabric, which may be arranged in two or more layers of different degrees of fineness; for example, there may be an outer layer of relatively thick fabric, such as burlap, and an inner layer of finer fabric, such as cheese-cloth. This inner layer more minutely subdivides the air passing from the tube, so that the air is thoroughly distributed in passing through the outer layer and the hydrocarbon liquid above it. The relatively thick outer layer absorbs the hydrocarbon liquid and increases the carbureting effect.

The air distributer is provided with a float 30 whereby its delivering members are maintained in a substantially horizontal position at a predetermined depth below the surface of the body of liquid 13. The said float, which may be made of cork or of other suitable buoyant construction, is preferably located mainly above the air distributer, and as here shown, is formed to cover the entire area of the air distributer and project beyond its ends, the float being secured to the air distributer by any suitable means, such as ears 31 projecting from the central member 26, and attached to the side edges of the float, and U-shaped straps or loops 32 the ends of which are attached to the under side of the float, said loops embracing the outer end portions of the tubes 27. The portion of the float which is immediately over the air distributer is apertured to permit the upward passage of gas through the float, a plurality of apertures 33 being preferably provided for this purpose. The air which is discharged into the hydrocarbon liquid by the distributer passes through the portion of the liquid located above the distributer and emerges from the apertures 33 as a gas.

In practice, where a large volume of gas is passing, the rising currents of gas so agitate the hydrocarbon liquid as to carry portions of it upwardly and form these portions into bubbles on the upper surface of the float. To enable a mass of bubbles to accumulate on the upper surface of the float, I provide the latter with a curb 34 surrounding the apertured portion of the float, said curb confining the base of an accumulation of bubbles so that they form a sort of mound 35, as indicated by wavy broken lines in Fig. 2. The gas in passing through the mound of bubbles ruptures the walls of the bubbles, and thus converts the liquid of which they are formed into spray which adds to the enrichment of the gas. The upper surface of the float constitutes a bubble-supporting bed located above the entire series of air outlets, so that the bubbles are supported in the paths of the ascending jets of air. When a relatively small volume of gas is passing, the formation of bubbles does not occur, the bubbles forming and adding to the enrichment of the gas only when the volume of gas is relatively large, so that there is an automatic increase in the quantity of hydrocarbon liquid presented to the ascending gas when the volume of the gas increases.

An important feature of my invention is a substantially horizontal air distributer having numerous relatively small air outlets of practically uniform size, such as are provided by the openings in the tubes 27, said outlets constituting the only means for discharging air into the surrounding body of hydrocarbon liquid, and being located at different heights, and therefore at different distances from the surface of the body of hydrocarbon liquid, and all being maintained below the said surface, so that air issuing from each outlet passes upwardly through liquid above it. The arrangement of the air-distributing outlets at different heights is due to the fact that the outlets are formed in the wall of a tubular air-conducting member, such as the tube 27, said member being maintained with its major axis substantially horizontal, and with its upper surface below the surface of the hydrocarbon liquid. The result of this arrangement is the discharge into the body of liquid of a number of jets of air proportioned to the load or volume of the introduced air. When the volume is relatively small, the major part of each tube 27 is filled with hydrocarbon liquid, the air displacing only a relatively small part of the liquid within the tube, and emerging through a correspondingly small number of orifices, as indicated in Fig. 3. As the air volume increases, the displacement of liquid from the interior of the tubes 27 is correspondingly increased, and a greater number of outlet orifices in the tube become operative to deliver air into the main body of liquid, as indicated in Fig. 4. It will be seen, therefore, that an increase of air volume, instead of forcing the air at greater velocity through an unvarying number of outlets and through the hydrocarbon liquid, increases the number of jets of air discharged, without materially increasing the velocity of its passage through the liquid, each jet of air being therefore uniformly carbureted. If the air outlets in the distributing members were all practically at the same height or level, or if the distributing members were vertically instead of horizontally elongated, an increase of air volume would cause the air to pass with increased velocity through the hydrocarbon liquid, and thus fail to take up the desired proportion of hydrocarbon vapor, the result being an impoverished gas. With my arrangement of tubular distributing members horizontally elongated and having air outlets located at different heights, this objection is avoided, the increased air volume simply increasing the number of air outlets without materially increasing the velocity of the air passing through the liquid, so that all the air is uniformly enriched and the maximum efficiency of the apparatus is insured.

Owing to the fact that the air can be discharged into the hydrocarbon liquid only through a multiplicity of small outlets of practically uniform size, such as are provided by the perforations of a horizontally elongated sheet metal tube 27, or by the meshes of a horizontal tube of woven wire, the discharged air is wholly in the form of small jets of practically uniform size, so that all the air is uniformly charged or enriched, no discharge of air in relatively large streams or bodies which are too large to be uniformly enriched, being possible. The horizontal elongation of the tubes 28 always insures a sufficient number of operative air outlets to permit the free discharge of air at the pressure existing in the air supplying conduit. In other words, the air is not additionally compressed in the tubes 28 and therefore is not discharged into the hydrocarbon liquid so forcibly or rapidly as to cause insufficient enrichment of the air during its passage through the liquid.

The air distributer, float, and the air-supplying conduit are so proportioned that they are adapted to pass through the opening 18 formed in an end wall of the tank, so that when the closure 17 is disconnected from the tank, the above mentioned parts may be readily removed from the tank through said opening for repairs, and may subsequently be reinserted through the same opening. Owing to the horizontal elongation of the distributer and float, their cross sectional area is relatively small, and a correspondingly small opening or hand hole 18 which may be conveniently provided in an end wall of the tank above the liquid level, is sufficient to permit the insertion and removal of the distributer and float in a horizontal direction. An adequate opening in an end wall may be made of a much smaller size than one made in the top, and may therefore be more easily closed to prevent the escape of gas.

The hydrocarbon liquid may be introduced through a suitable opening (not shown) in the top of the tank, said opening having a suitable closure.

I claim:

1. A carbureter comprising a tank having an air inlet, a horizontally elongated foraminous tubular air distributer movable within the tank and having a mutiplicity of air outlets of practically uniform size located at different heights, a flexible connection between the distributer and the air inlet, said distributer having means for maintaining it in a substantially horizontal position below the surface of a body of liquid in the tank and immersed from end to end in said liquid, and the air outlets of the distributer being covered by the surrounding liquid and located at different distances from the surface of the liquid, and constituting the only means for discharging air into the surrounding liquid, whereby the number of operative outlets is proportioned to the air pressure, and the discharge of air in relatively large or excessively rapid streams is prevented.

2. A carbureter comprising a tank having an air inlet, a flotative air distributer movable within the tank and including a receiving member and a plurality of elongated foraminous delivering members, a flexible conduit connecting the air inlet with the receiving member, the said distributer having means for maintaining the delivering members in a substantially horizontal position below the surface of a body of liquid in the tank, and each of said delivering members having air outlets located at different distances from the surface of the liquid.

3. A carbureter comprising a tank having an air inlet, a horizontally elongated foraminous tubular air distributer movable within the tank and having a multiplicity of air outlets of practically uniform size located at different heights, and constituting the only means for discharging air into the surrounding liquid, a flexible connection between the distributer and the air inlet, and a float adapted to maintain the distributer in a substantially horizontal position below the surface of a body of liquid in the tank, so that all the air outlets are covered by the liquid.

4. A carbureter comprising a tank having an air inlet, a foraminous air distributer movable within the tank and having its air outlets located at different heights, a flexible connection between the distributer and the air inlet, and a float adapted to maintain the distributer in a substantially horizontal position below the surface of a body of liquid in the tank, said float being above the distributer and apertured to permit the upward passage of carbureted air through it.

5. A carbureter comprising a tank having an air inlet, a foraminous air distributer movable within the tank and having its air outlets located at different heights, a flexible connection between the distributer and the air inlet, said distributer having an apertured float secured to and located above the distributer, and adapted to maintain the latter in a substantially horizontal position below the upper surface of a body of liquid in the tank, the float being formed to support an accumulation of bubbles over the apertured portion.

6. A carbureter comprising a tank having a fixed air inlet, a swinging air conductor flexibly connected at one end to said inlet, and having its opposite end formed as an air-delivering trunnion, and a horizontally elongated flotative air distributer composed of a receiving member journaled on said delivering trunnion, and a plurality of substantially horizontal tubular foraminous distributing members projecting from the receiving member and each having a multiplicity of air outlets of practically uniform size located at different heights and constituting the only means for discharging air into the surrounding liquid, the distributer being provided with means for maintaining its air-distributing members in a substantially horizontal position below the surface of a body of liquid in the tank, so that all the air outlets are covered by said liquid.

7. A carbureter comprising a tank having a fixed air inlet including a bearing located within the tank, a swinging air conductor having at one end an air-receiving trunnion journaled in said bearing, and at the other end an air-delivery trunnion, and a horizontally elongated flotative distributer composed of a receiving member journaled on said delivering trunnion, and a plurality of substantially horizontal tubular foraminous distributing members projecting from the receiving member and each having a multiplicity of air outlets of practically uniform size located at different heights and constituting the only means for discharging air into the surrounding liquid, the distributer being provided with means for maintaining its air-distributing members in a substantially horizontal position below the surface of a body of liquid in the tank, so that all the air outlets are covered by said liquid.

8. A carbureter comprising a tank having an opening in one of its end walls, a closure for said opening, said closure having an air inlet and a bearing projecting from its inner side into said opening, a swinging air-conductor having at one end an air-receiving trunnion journaled in said bearing, and at its other end an air-delivering trunnion, and a horizontally elongated air distributer journaled on said delivering trunnion and provided with a float, the said opening being of such form that the said distributer and air conductor are adapted to pass horizontally through the opening in the tank, and means for detachably securing the closure to the tank.

9. In a carbureter, a flotative air distributer comprising an air-receiving member formed as a casing having trunnion bearings at its end portions, and tubular foraminous air-distributing members projecting from the receiving member, and each having air outlets distributed around its periphery, and a float adapted to maintain the distributing members in a substantially horizontal position below a body of liquid supporting the distributer.

10. In a carbureter, a flotative air distributer comprising an air-receiving member formed as a casing having trunnion bearings at its end portions, and tubular foraminous air distributing members projecting from the receiving member, and each having air outlets distributed around its periphery, and a float adapted to maintain the distributing members in a substantially horizontal position below a body of liquid supporting the distributer, said distributing members being provided with wrappings of textile fabric.

11. A carbureter comprising a tank having an air inlet, and a horizontally elongated flotative tubular air distributer maintained below the surface of a body of liquid in the tank, and having a multiplicity of air outlets of practically uniform size located at different heights, said outlets constituting the only means for discharging air into the surrounding liquid, and all being covered by the liquid.

12. A carbureter comprising a tank having an air inlet, and a horizontally elongated flotative air distributer maintained horizontally below the surface of a body of liquid in the tank, and having air outlets located at different heights, the distributer being provided with a substantially horizontal bed located over the air outlets for supporting an accumulation of bubbles in the paths of the ascending jets of air or gas, and thereby automatically increasing the quantity of liquid presented to the ascending gas as the volume of said gas increases.

In testimony whereof I have affixed my signature, in presence of two witnesses.

GILMAN W. BROWN.

Witnesses:
C. F. BROWN,
A. W. HARRISON.

---

It is hereby certified that in Letters Patent No. 951,590, granted March 8, 1910, upon the application of Gilman W. Brown, of West Newbury, Massachusetts, for an improvement in "Carbureters," an error appears in the printed specification requiring correction as follows: Page 1, line 65, the words "upon the periphery of the" should be stricken out and the words *of said conduit is an air-* inserted instead; and that the said Letters Patent should be read with this correction therein that the same may conform to the record of the case in the Patent Office.

Signed and sealed this 22d day of March, A. D., 1910.

[SEAL.]

C. C. BILLINGS,

*Acting Commissioner of Patents.* zontally elongated flotative distributer composed of a receiving member journaled on said delivering trunnion, and a plurality of substantially horizontal tubular foraminous distributing members projecting from the receiving member and each having a multiplicity of air outlets of practically uniform size located at different heights and constituting the only means for discharging air into the surrounding liquid, the distributer being provided with means for maintaining its air-distributing members in a substantially horizontal position below the surface of a body of liquid in the tank, so that all the air outlets are covered by said liquid.

8. A carbureter comprising a tank having an opening in one of its end walls, a closure for said opening, said closure having an air inlet and a bearing projecting from its inner side into said opening, a swinging air-conductor having at one end an air-receiving trunnion journaled in said bearing, and at its other end an air-delivering trunnion, and a horizontally elongated air distributer journaled on said delivering trunnion and provided with a float, the said opening being of such form that the said distributer and air conductor are adapted to pass horizontally through the opening in the tank, and means for detachably securing the closure to the tank.

9. In a carbureter, a flotative air distributer comprising an air-receiving member formed as a casing having trunnion bearings at its end portions, and tubular foraminous air-distributing members projecting from the receiving member, and each having air outlets distributed around its periphery, and a float adapted to maintain the distributing members in a substantially horizontal position below a body of liquid supporting the distributer.

10. In a carbureter, a flotative air distributer comprising an air-receiving member formed as a casing having trunnion bearings at its end portions, and tubular foraminous air distributing members projecting from the receiving member, and each having air outlets distributed around its periphery, and a float adapted to maintain the distributing members in a substantially horizontal position below a body of liquid supporting the distributer, said distributing members being provided with wrappings of textile fabric.

11. A carbureter comprising a tank having an air inlet, and a horizontally elongated flotative tubular air distributer maintained below the surface of a body of liquid in the tank, and having a multiplicity of air outlets of practically uniform size located at different heights, said outlets constituting the only means for discharging air into the surrounding liquid, and all being covered by the liquid.

12. A carbureter comprising a tank having an air inlet, and a horizontally elongated flotative air distributer maintained horizontally below the surface of a body of liquid in the tank, and having air outlets located at different heights, the distributer being provided with a substantially horizontal bed located over the air outlets for supporting an accumulation of bubbles in the paths of the ascending jets of air or gas, and thereby automatically increasing the quantity of liquid presented to the ascending gas as the volume of said gas increases.

In testimony whereof I have affixed my signature, in presence of two witnesses.

GILMAN W. BROWN.

Witnesses:
C. F. BROWN,
A. W. HARRISON.

---

Correction in Letters Patent No. 951,590.

It is hereby certified that in Letters Patent No. 951,590, granted March 8, 1910, upon the application of Gilman W. Brown, of West Newbury, Massachusetts, for an improvement in "Carbureters," an error appears in the printed specification requiring correction as follows: Page 1, line 65, the words "upon the periphery of the" should be stricken out and the words *of said conduit is an air-* inserted instead; and that the said Letters Patent should be read with this correction therein that the same may conform to the record of the case in the Patent Office.

Signed and sealed this 22d day of March, A. D., 1910.

[SEAL.]

C. C. BILLINGS,

*Acting Commissioner of Patents.*

Correction in Letters Patent No. 951,590.

It is hereby certified that in Letters Patent No. 951,590, granted March 8, 1910, upon the application of Gilman W. Brown, of West Newbury, Massachusetts, for an improvement in "Carbureters," an error appears in the printed specification requiring correction as follows: Page 1, line 65, the words "upon the periphery of the" should be stricken out and the words *of said conduit is an air* inserted instead; and that the said Letters Patent should be read with this correction therein that the same may conform to the record of the case in the Patent Office.

Signed and sealed this 22d day of March, A. D., 1910.

[SEAL.]

C. C. BILLINGS,
*Acting Commissioner of Patents.*